United States Patent
Orr et al.

(10) Patent No.: US 12,549,337 B2
(45) Date of Patent: Feb. 10, 2026

(54) SYSTEM AND METHOD FOR GENERATING A PRIVATE GROUP ENCRYPTION KEY BASED ON A UNIQUE GROUP IDENTIFIER

(71) Applicant: Cisco Technology, Inc., San Jose, CA (US)

(72) Inventors: Stephen M Orr, Wallkill, NY (US); Shree Narasimha Murthy, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 198 days.

(21) Appl. No.: 18/453,744

(22) Filed: Aug. 22, 2023

(65) Prior Publication Data

US 2024/0380576 A1 Nov. 14, 2024

Related U.S. Application Data

(60) Provisional application No. 63/502,111, filed on May 14, 2023.

(51) Int. Cl.
*H04L 9/08* (2006.01)
*H04L 9/40* (2022.01)

(52) U.S. Cl.
CPC .......... *H04L 9/0833* (2013.01); *H04L 9/0822* (2013.01); *H04L 63/065* (2013.01)

(58) Field of Classification Search
CPC ... H04L 9/0833; H04L 9/0822; H04L 63/065; H04L 9/08
See application file for complete search history.

(56) References Cited

U.S. PATENT DOCUMENTS

| | | | | |
|---|---|---|---|---|
| 7,434,046 | B1 * | 10/2008 | Srivastava | H04L 9/0891 713/168 |
| 2012/0257756 | A1 * | 10/2012 | Huang | H04L 9/0836 380/281 |

(Continued)

FOREIGN PATENT DOCUMENTS

WO 2022090435 5/2022

OTHER PUBLICATIONS

IEEE International Standard: "Information Technology—Telecommunications and Information Exchange Between Systems—Local and Metropolitan Area Networks—Specific Requirements, Part 11: Wireless LAN Medium Access Control (MAC) and Physical Layer (PHY) Specifications", IEEE Std 802.11i-2004, Piscataway, NJ, USA, Jul. 23, 2004, pp. c1-c178, XP017602007, ISBN: 978-0-7381-4073-5, The Whole Document, 197 Pages.

(Continued)

*Primary Examiner* — Quazi Farooqui
(74) *Attorney, Agent, or Firm* — Polsinelli P.C.

(57) ABSTRACT

A system and method are provided for generating group encryption keys for a global group and a private group to encrypt wireless messages between an access point and a station. The private group key is based on a unique private group identifier. The global group key and the private group key are sent from the access point to one or more stations via an M3 message as part of a 4-way handshake or as part of a 2-way group key handshake. The global group key is used for encrypted broadcast or multicast messages with an entire group, whereas the private group key is used for encrypted broadcast or multicast messages with a private group that is a subset of the entire group.

20 Claims, 7 Drawing Sheets

(56) References Cited

U.S. PATENT DOCUMENTS

| | | |
|---|---|---|
| 2018/0152425 A1 | 5/2018 | Ram et al. |
| 2019/0103966 A1* | 4/2019 | Zimny .............. H04W 12/0433 |
| 2020/0259799 A1* | 8/2020 | Li ........................ H04L 9/0897 |
| 2020/0366474 A1 | 11/2020 | Wang et al. |
| 2023/0075259 A1 | 3/2023 | Smith et al. |

OTHER PUBLICATIONS

International Search Report and Written Opinion for International Application No. PCT/US2024/027364, mailed Aug. 8, 2024, 13 Pages.

Zhou Z., et al., "Optimal Multicast Group Communication", IACR, International Association for Cryptologic Research, vol. 20100312:073210, Mar. 12, 2010, 12 Pages, XP061003753, Retrieved on Mar. 12, 2010 The Whole Document.

* cited by examiner

SYSTEM AND METHOD FOR GENERATING A PRIVATE GROUP ENCRYPTION KEY BASED ON A UNIQUE GROUP IDENTIFIER

CROSS-REFERENCE TO RELATED APPLICATIONS

This application claims the benefit of priority to U.S. provisional application No. 63/502,111, filed on May 14, 2023, which is expressly incorporated by reference herein in its entirety.

BACKGROUND

Wi-Fi (i.e., IEEE 802.11) supports unicast, multicast, and broadcast messages. Unicast traffic is encrypted with a unique pairwise key between the station (STA) and the access point (AP). Multicast and broadcast messages can be encrypted using a group key, which is shared among the STAs within a basic service set identifier (BSSID). Because the same group key is shared among the entire BSSID, this configuration cannot provide segmentation in which a broadcast or multicast message can only be encrypted/decrypted by a subset of all STAs in the BSSID. Thus, a drawback of this configuration is that information can leak between devices, which could be problematic when the leaked information includes personally identifiable information, such as can occur when a device (e.g., mobile phone or laptop) is sending out signals via broadcast and multicast mechanism (e.g., multicast DNS messages or simple service discovery protocol messages) to discover resources.

It is desirable to encrypt multicasts and broadcast messages sent between the AP and the STAs to protect said messages from tampering. Further, multicasts and broadcast messages avoid the inefficiencies of unicast messaging in which the same traffic is simultaneously replicated to multiple stations. In view of the advantages of multicasts and broadcast messaging, the infrastructure maintains a separate key hierarchy specifically for the use of multicast. This infrastructure for multicasts is called the group-key hierarchy.

Currently, the group-key hierarchy is applicable to all the STAs belonging to the same BSSID (e.g., broadcast domain). Wi-Fi does not, however, provide for situations where it is desirable to send multicast messages to only a subset of the STAs, rather than to the entire BSSID. That is, Wi-Fi does not provide for situations where the multicast messages are encrypted such that only the subset of the BSSID can decrypt the messages.

Consider, for example, the use cases for multi-dwelling units, residential access, college dorms, and other shared service infrastructure settings. In these cases, there is a need to connect to the global network and use services offered in the global network, receive broadcast/multicast for the particular broadcast domain they are connected to (e.g., BSSID, virtual local area network (VLAN), or virtual extensible local area network (VXLAN)) while at the same time belong to a private group where only the private group can see services being advertised from devices in the private group.

Wi-Fi, however, does not currently provide encrypted broadcast and multicast to just a subset of the BSSID (e.g., broadcast domain). Thus, an improved method is desired to provide encrypted broadcast and multicast to just a subset of the BSSID (e.g., broadcast domain).

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

In one aspect, a method is provided for generating group encryption keys for a global group and a private group on a wireless station. The method includes: generating a global group key; generating a private group key based on a unique private group identifier; and sending the global group key and the private group key to one or more stations, wherein the global group key encrypts broadcast or multicast messages that can be decrypted by an entire group and the private group key encrypts broadcast or multicast messages that can be decrypted by a private group that is a subset of the entire group.

In another aspect, the method may also include rotating the global group key and the private group key on the one or more stations, wherein each of the one or more stations has four or more key slots for storing keys, two of the slots being used for storing current keyIDs for the global group key and the private group key, and remaining key slots being used for rotating the global group key and the private group key In another aspect, the method may also include that each of the one or more stations has a total of four key slots for storing keys, a first slot and a third slot respectively storing the current keyIDs for the global group key and the private group key, and a second slot and a fourth slot respectively storing new keyIDs for the global group key and the private group key.

In another aspect, the method may also include sending the global group key and the private group key in an M3 message.

In another aspect, the method may also include that the M3 message comprises an EAPOL-Key frame that is based on a pairwise transient key (PTK) generated as part of a 4-way handshake.

In another aspect, the method may also include that the M3 message is part of a 2-way Group Key handshake.

In another aspect, the method may also include that in the private group key is generated at least based on the unique private group identifier and a group master key.

In another aspect, the method may also include that the private group key is generated using an HKDF-Expand function.

In another aspect, the method may also include encrypting plaintext into cyphertext using the private group key; and sending the cyphertext to the private group.

In another aspect, the method may also include encrypting a broadcast or multicast message into another cyphertext using the global group key; and sending the another cyphertext to the entire group.

In one aspect, a computing apparatus includes a processor. The computing apparatus also includes a memory storing instructions that, when executed by the processor, configure the apparatus to: generate a global group key; generate a private group key based on a unique private group identifier; and send the global group key and the private group key to one or more stations, wherein the global group key encrypts broadcast or multicast messages that can be decrypted by an entire group and the private group key encrypts broadcast or multicast messages that can be decrypted by a private group that is a subset of the entire group.

In another aspect, the computing apparatus may also include that when executed by the processor, the instructions stored in the memory cause the processor to rotate the global group key and the private group key on the one or more stations, wherein each of the one or more stations has four or more key slots for storing keys, two of the slots being used for storing current keyIDs for the global group key and the private group key, and remaining key slots being used for rotating the global group key and the private group key.

In another aspect, the computing apparatus may also include that each of the one or more stations has a total of four key slots for storing keys, a first slot and a third slot respectively storing the current keyIDs for the global group key and the private group key, and a second slot and a fourth slot respectively storing new keyIDs for the global group key and the private group key.

In another aspect, the computing apparatus may also include that when executed by the processor, the instructions stored in the memory cause the processor to send the global group key and the private group key in an M3 message.

In another aspect, the computing apparatus may also include that the M3 message comprises an EAPOL-Key frame that is based on a pairwise transient key (PTK) generated as part of a 4-way handshake.

In another aspect, the computing apparatus may also include that the M3 message is part of a 2-way Group Key handshake.

In another aspect, the computing apparatus may also include that the private group key is generated at least based on the unique private group identifier and a group master key.

In another aspect, the computing apparatus may also include that the private group key is generated using an HKDF-Expand function.

In another aspect, the computing apparatus may also include that when executed by the processor, the instructions stored in the memory cause the processor to encrypt plaintext into cyphertext using the private group key; and send the cyphertext to the private group.

In another aspect, the computing apparatus may also include that when executed by the processor, the instructions stored in the memory cause the processor to encrypt a broadcast or multicast message into another cyphertext using the global group key; and send the another cyphertext to the entire group.

In one aspect, a non-transitory computer-readable storage medium, the computer-readable storage medium including instructions that when executed by a computer, cause the computer to: rotate the global group key and the private group key on the one or more stations, wherein each of the one or more stations has four or more key slots for storing keys, two of the slots being used for storing current keyIDs for the global group key and the private group key, and remaining key slots being used for rotating the global group key and the private group key.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for providing broadcast and multicast messages to a subset of the basic service set identifier (BSSID), in addition to the functionality that provides broadcast and multicast messages to the entire BSSID. Thus, encrypted messages can be broadcast or multicast to the subset without making them accessible (i.e., can be decrypted) to the entire BSSID. Previously, such messages that cannot be decrypted by the entire BSSID would have been sent via unicast or a similar protocol that is less efficient than multicast and broadcast messaging.

Whereas previously the group-key hierarchy was applicable to all the STAs belonging to the same BSSID, the systems and methods disclosed herein are configured to send encrypted multicast messages to a subset of the STAs, rather than to the entire BSSID. This subset is determined by a private group as created by the user; without compromising on the network performance. According to certain non-limiting examples, this functionality of private groups is enabled by generating two Group Keys—one designated to encrypt/decrypt "global multicast/broadcast traffic" and another Group Key designated to encrypt/decrypt "private group multicast/broadcast."

Aspects of the present disclosure can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

IEEE 802.11, commonly referred to as Wi-Fi, has been around for three decades and has become arguably one of the most popular wireless communication standards, with billions of devices supporting more than half of the worldwide wireless traffic. Wi-Fi generally has a new amendment after every 5 years with its own characteristic features. Various security related changes were proposed as part of IEEE 802.11i. IEEE 802.11i enhances IEEE 802.11-1999 by providing a Robust Security Network (RSN) with two new protocols (i.e., the four-way handshake and the group key handshake), which use the authentication services and port access control described in IEEE 802.1X to establish and change respective cryptographic keys. The RSN is a security network that only allows the creation of robust security network associations (RSNAs), which are a type of association used by a pair of stations (STAs) if the procedure to establish authentication or association between them includes the 4-Way Handshake.

IEEE 802.11i provides various security enhancements. Further, IEEE 802.11i references the Extensible Authentication Protocol (EAP) standard, which is a means for providing mutual authentication between STAs and the WLAN infrastructure, as well as performing automatic cryptographic key distribution. IEEE 802.11i generates cryptographic checksums through hash message authentication codes (HMAC). The IEEE 802.11i specification introduces the concept of a Robust Security Network (RSN), which is defined as a wireless security network that only allows the creation of Robust Security Network Associations (RSNA). An RSNA is a logical connection between communicating IEEE 802.11 entities established through the IEEE 802.11i key management scheme, called the 4-Way handshake, which is a protocol that validates that both entities share a pairwise master key (PMK), synchronizes the installation of temporal keys, and confirms the selection and configuration of data confidentiality and integrity protocols. The PMK serves as the basis for the IEEE 802.11i data confidentiality and integrity protocols that provide enhanced security relative to previous techniques (e.g., Wired Equivalent Privacy (WEP)).

The IEEE 802.1X standard defines several terms related to authentication: authenticator, supplicant, and authentication server. The authenticator is an entity such as an AP that facilitates an authentication attempt. The supplicant is an entity such as a STA that is authenticated by an authenticator. The authentication server (AS) is an entity that provides an authentication service to an authenticator. This service determines, from the credentials provided by the supplicant, whether the supplicant is authorized to access the services provided by the authenticator. The AS either authenticates the STA and AP itself, or it provides information to the STA and AP so that they may authenticate each other.

Recently, the increasing user demands in terms of throughput, capacity, latency, spectrum, and power efficiency have motivated updates or amendments to the IEEE 802.11 standard. In the earlier generations, amendments to the IEEE 802.11 focused primarily on improving the data rates. As the density of devices has with increased, however, area efficiency has become a major concern for Wi-Fi networks. Due to this issue, the last (802.11 be (Wi-Fi 7)) amendments focused more on efficiency. The next expected update to IEEE 802.11 is coined as Wi-Fi 8. Wi-Fi 8 will attempt to further enhance throughput and minimize latency to meet the growing demand for the Internet of Things (IOT), high-resolution video streaming, low-latency wireless services, etc.

Figure 1:
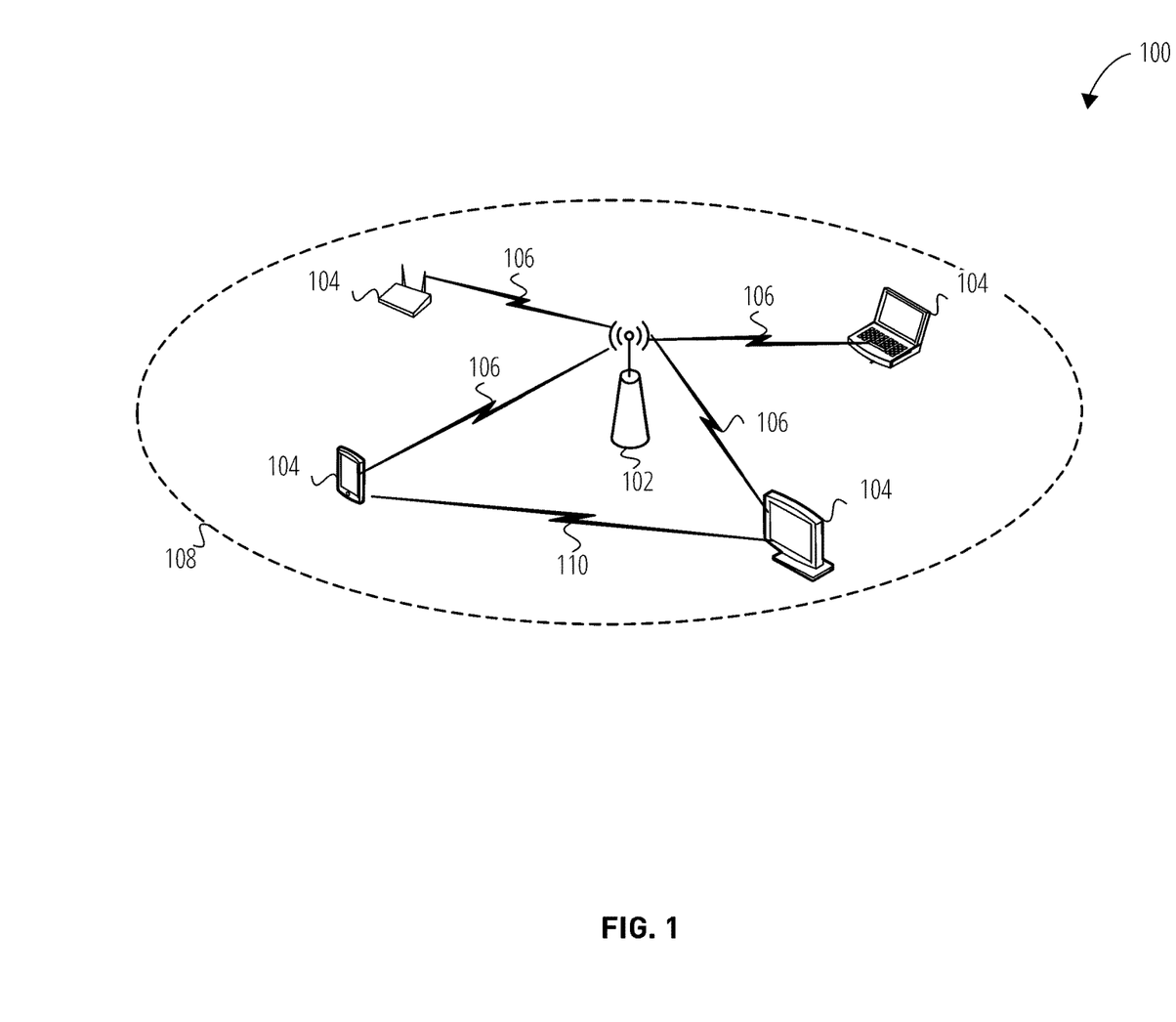
FIG. 1 illustrates a schematic diagram of an example of a wireless communication network, in accordance with certain embodiments.

FIG. 1 shows a block diagram of an example wireless communication network according to some aspects of the present disclosure. Wireless communication network 100 can be an example of a wireless local area network (WLAN) such as a Wi-Fi network (and will hereinafter be referred to as WLAN 100). For example, WLAN 100 can be a Wi-Fi network operating based on any IEEE 802.11 protocols and standards (e.g., 802.11 ay, 802.11 ax, 802.11az, 802.11ba, and 802.11bc). WLAN 100 may include wireless communication devices such as an AP 102 and multiple STAs 104. The number of APs and STAs are not limited to that shown in FIG. 1 and can be more or less.

Each of STAs 104 can be any one or more of mobile phones, personal digital assistants (PDAs), other handheld devices, netbooks, notebook computers, tablet computers, laptops, display devices (for example, TVs, computer monitors, navigation systems, among others), music or other audio or stereo devices, remote control devices ("remotes"), printers, kitchen or other household appliances, key fobs (for example, for passive keyless entry and start (PKES) systems), IoT devices, etc.

A single AP 102 and an associated set of STAs 104 may be referred to as a basic service set (BSS), managed by AP 102.

FIG. 1 shows an example coverage area 108 of AP 102, which may represent a basic service area (BSA) of WLAN 100. BSS may be identified to users by a service set identifier (SSID), as well as to other devices by a basic service set identifier (BSSID), which may be a medium access control (MAC) address of AP 102. AP 102 can periodically broadcast beacons including BSSID to enable any STA 104 within the wireless range of AP 102 to "associate" or re-associate with AP 102 to establish a communication link 106 with AP 102. For example, the beacons can include an identification of a primary channel used by respective AP 102 as well as a timing synchronization function for establishing or maintaining timing synchronization with AP 102.

To establish a communication link 106 with an AP 102, each of STAs 104 is configured to perform passive or active scans on frequency channels in one or more frequency bands (for example, the 2.4 GHz, 5 GHz, 6 GHz or 60 GHz bands). Passive scans entail an STA 104 listening for beacons transmitted by AP 102 at a periodic time interval referred to as the target beacon transmission time (TBTT) (measured in time units (TUs) where one TU may be equal to 1024 microseconds (μs)).

Active scans entail an STA 104 generating and sequentially transmitting probe requests on each channel to be scanned and listening for probe responses from APs 102. Each STA 104 may be configured to identify or select an AP 102 with which to associate based on the scanning information obtained through the passive or active scans, and performing authentication and association operations to establish a communication link 106 with a selected AP 102. AP 102 assigns an association identifier to STA 104 at the conclusion of the association operations, which AP 102 can then utilize to track STA 104.

Figure 2:
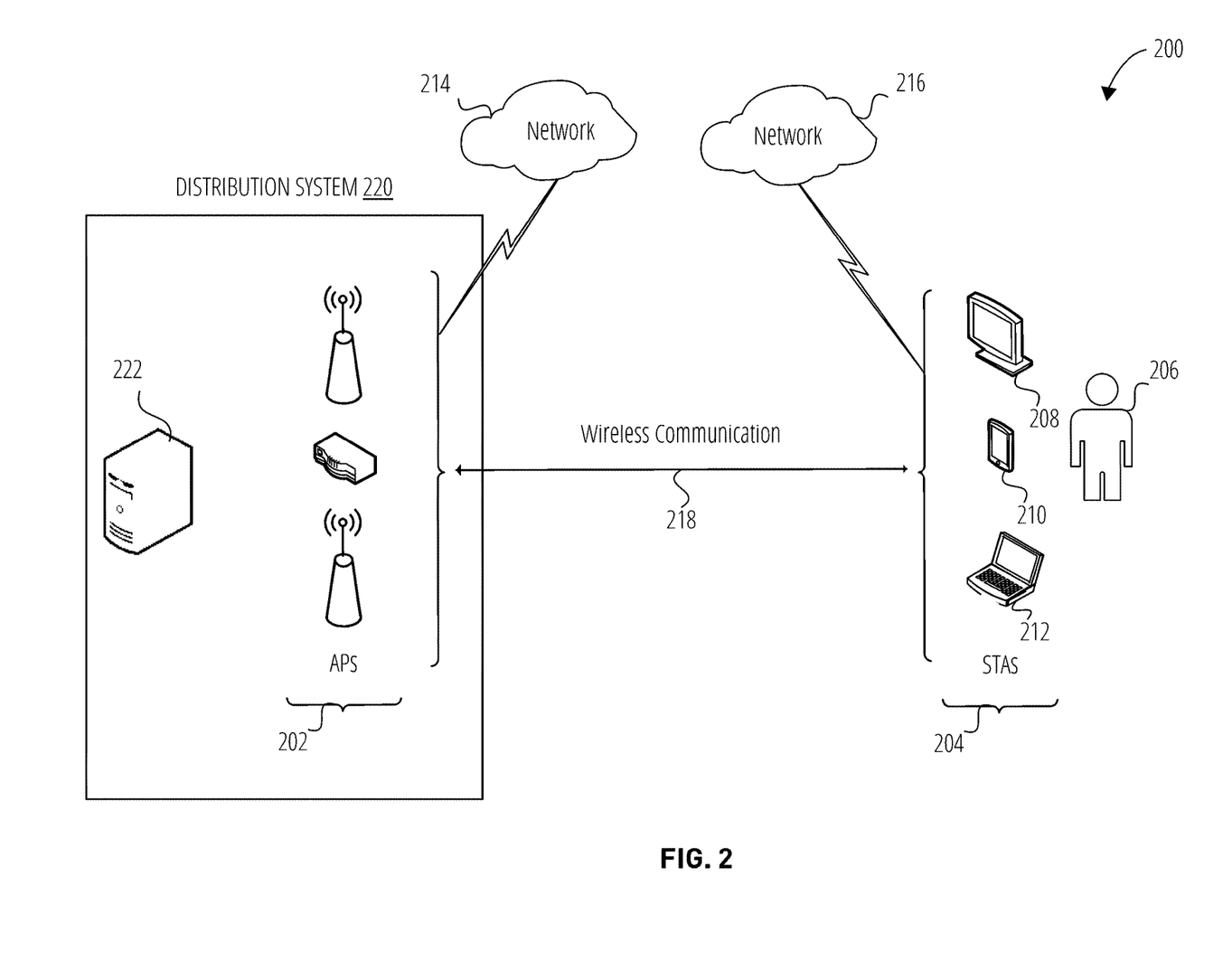
FIG. 2 illustrates a schematic diagram of an example of multi-link operation in the wireless network, in accordance with certain embodiments.

FIG. 2 is a network diagram illustrating an example network environment of multi-link operation, according to some aspects of the present disclosure. Wireless network 200 may include one or more STAs 204 (includes example devices 208, 210, and 212) and one or more APs 202, which may communicate in accordance with IEEE 802.11 communication standards. STAs 204 and APs 202 may be the same as STAs 104 and AP 102 of FIG. 1, respectively.

One or more STAs 204 and/or APs 202 may be operable by one or more user(s) 206.

STAs 204 and/or APs 202 may also include mesh stations in, for example, a mesh network, in accordance with one or more IEEE 802.11 standards and/or 3GPP standards.

Any of STAs 204 and APs 202 may be configured to communicate with each other via one or more communications networks 214 and/or networks 216, which may be the same as WLAN 100. STAs 204 may also communicate peer-to-peer or directly with each other with or without APs 202. Any of the communications networks 214 and/or networks 216 may include, but are not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 214 and/or networks 214 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 214 and/or networks 216 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of STAs 204 and APs 202 may be configured to perform directional transmission and/or directional reception in conjunction with wirelessly communicating in a wireless network. Any of STAs 204 and APs 202 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of STAs 204 and APs 202 may be configured to perform any given directional transmission towards one or more defined transmit sectors. Any of STAs 204 and APs 202 may be configured to perform any given directional reception from one or more defined receive sectors.

Multiple Input—Multiple Output (MIMO) beamforming in a wireless network may be accomplished using RF beamforming and/or digital beamforming. In some embodiments, in performing a given MIMO transmission, STAs 204 and/or APs 202 may be configured to use all or a subset of its one or more communications antennas to perform MIMO beamforming.

Any of STAs 204 and APs 202 may include any suitable radio and/or transceiver for transmitting and/or receiving radio frequency (RF) signals in the bandwidth and/or channels corresponding to the communications protocols utilized by any of STAs 204 and APs 202 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In example embodiments, the radio component, in cooperation with the communications antennas, may be configured to communicate via 2.4 GHz channels (e.g., 802.11b, 802.11g. 802.11n, 802.11ax), 5 GHz channels (e.g., 802.11n, 802.11ac, 802.11ax), or 60 GHz channels (e.g., 802.11ad, 802.11ay). 800 MHz channels (e.g., 802.11ah). The communications antennas may operate at 28 GHz and 40 GHz. It should be understood that this list of communication channels in accordance with certain 802.11 standards is only a partial list and that other 802.11 standards may be used (e.g., Next Generation Wi-Fi, or other standards). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

In some examples, and with reference to FIG. 1, APs 102 may establish wireless communications 218 one or more STAs 204. For example, APs 102 may facilitate multi-link operation (MLO) with one or more STAs 204. The APs 202 can be connected to or included within a distribution system 220 that includes an authentication server 222. In one example, MLO may enable a single-radio non-AP MLD to achieve throughput enhancement and latency reduction in a busy network without needing to implement a concurrent dual-radio, thus significantly reducing device cost.

Now, security aspects of the wireless network 200 are discussed. The IEEE 802.1X standard defines several terms related to authentication. The authenticator is an entity at one end of a point-to-point LAN segment that facilitates authentication of the entity attached to the other end of that link. For example, the APs 202 in FIG. 2 can serve as authenticators. The supplicant is the entity being authenticated. The STAs 204 may be viewed as supplicants. The authentication server (AS) 222 is an entity that provides an authentication service to an authenticator. This service determines from the credentials provided by the supplicant whether the supplicant is authorized to access the services provided by the authenticator. The AS 222 provides these authentication services and delivers session keys to each of the APs 202 in the wireless network; each of the STAs 204 either receives session keys from the AS or derives the session keys itself. The AS either authenticates the STA and AP itself, or provides information to the STA and AP so that they may authenticate each other. The AS 222 typically lies inside the DS 220, as depicted in FIG. 2. When employing a solution based on the IEEE 802.11i standard, the AS 222 most often used for authentication is an Authentication, Authorization, and Accounting (AAA) server that uses the Remote Authentication Dial In User Service (RADIUS) or Diameter protocol to transport authentication-related traffic. The supplicant/authenticator model is intrinsically a unilateral rather than mutual authentication model: the supplicant authenticates to the network.

Further, according to a non-limiting example, FIG. 2 provides a conceptual view of components of a wireless network 200, including: STAs 204, APs 202, and the AS 222. In this example, the STAs 204 are the supplicants, and the APs 202 are the authenticators. Until successful authentication occurs between one of the STAs 204 and the AS 222, the STA's communications are blocked by the APs 202. Because the APs 202 sit at the boundary between the wireless and wired networks, this prevents the unauthenticated STA from reaching the wired network. According to certain non-limiting examples, the technique used to block the communications can be port-based access control.

Figure 3:
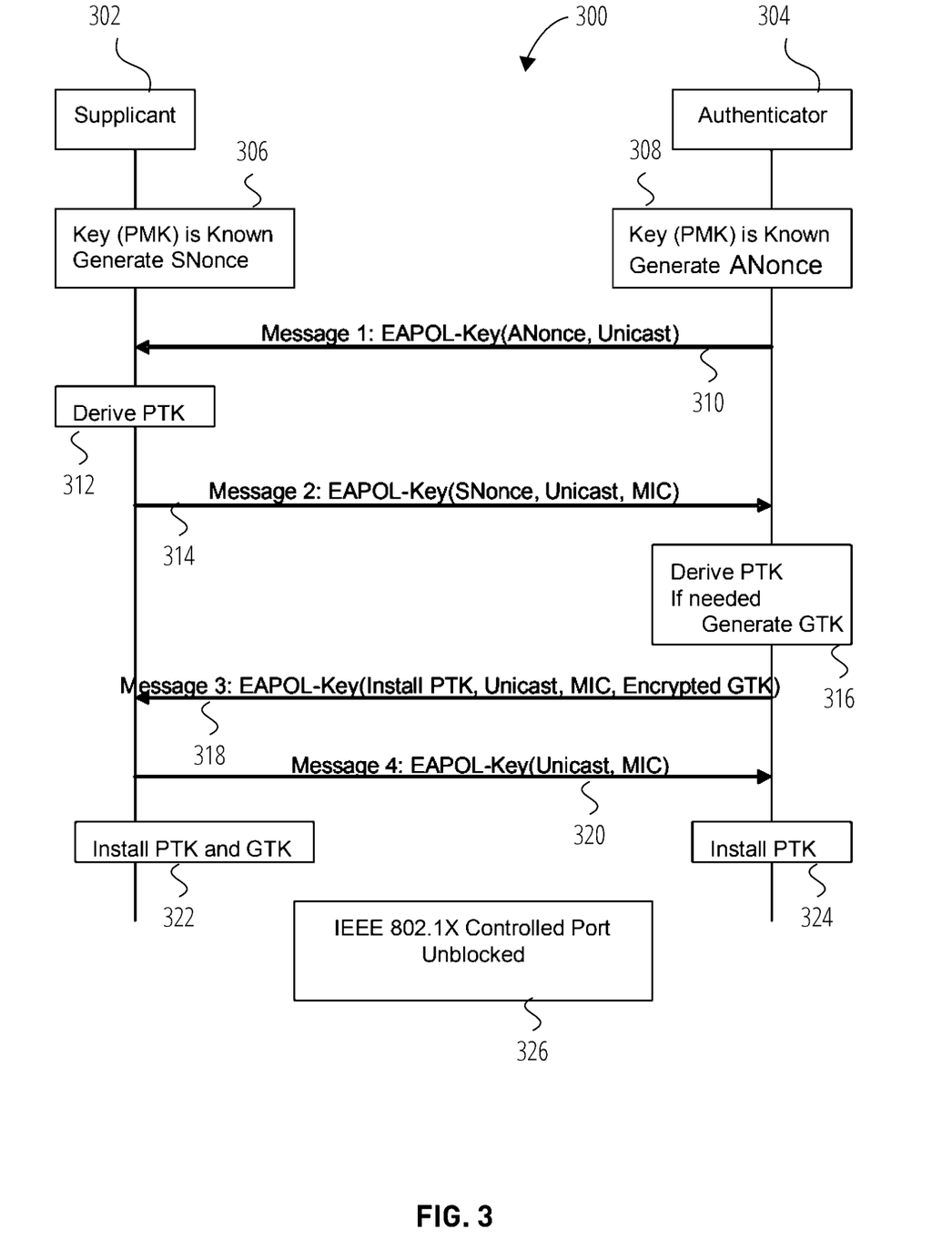
FIG. 3 illustrates a call flow of a 4-way handshake, in accordance with certain embodiments.

The 4-way handshake 300, which is illustrated in FIG. 3, is the process of exchanging four messages between an authenticator 304 and a supplicant 302 to generate encryption keys, which are then used to encrypt data sent over a wireless channel in the wireless network 200. The generated encryption keys can include a pairwise transient key (PTK) and a group temporal key (GTK). The PTK can be used, e.g., to encrypt all unicast traffic between a given STA 204 and a given AP 202 (i.e., the PTK is unique between the given STA 204 and the given AP 202). The GTK can be used to encrypt all broadcast and multicast traffic between multiple STAs 204 and the APs 202. The GTK is the key that is shared between all STA 204 in the BSSID.

The 4-way handshake 300 can use EAPOL-Key frames and can be initiated by the Authenticator to do the following: confirm that a live peer holds the PMK; confirm that the PMK is current; derive a fresh pairwise transient key (PTK) from the PMK; install the pairwise encryption and integrity keys into IEEE 802.11; transport from the authenticator 304 to the supplicant 302 the group temporal key (GTK) and private group temporal key (pGTK); transport the GTK sequence number from the authenticator 304 to the supplicant 302; install the GTK, pGTK, and GTK sequence number in the STAs 204 and, if not already installed, in the APs 202; and confirm the cipher suite selection.

At step 306, the supplicant 302 has a pairwise master key (PMK) and uses the PMK to generate a SNonce (supplicant nonce).

At step 308, the authenticator 304 uses the PMK to generate an ANonce (authenticator nonce).

At step 310, the authenticator 304 sends to the supplicant 302 message 1 (M1), which includes the ANonce. The 4-way handshake 300 can use EAPOL-Key frames to transmit the four messages: message 1 (M1) 310; message 2 (M2) 314; message 3 (M3) 318; and message 4 (M4) 320. EAPOL-Key frames are special key management frames used by stations to derive key information and establish secure communication. EAPOL-Key frames are also used to update expired temporal keys between associated stations. For example, the EAPOL-Key frames can be protected by a 128-bit key confirmation key (KCK) and a 128-bit key encryption key (KEK). For example, these keys are used with an AES algorithm in which the messages are encrypted with the 128-bit KEK using the AES key wrap defined in RFC 3394. The key wrap encrypts the data in 64-bit blocks, mixing in the output of the previous block to prevent repeating input from producing repeating output.

At step 312, the supplicant derives the PTK. According to certain non-limiting examples, the PTK is generated between the given STA 204 and the given AP 202, according to the following expression:

$$PTK = PRF(PMK + Anonce + SNonce + Mac(AA) + Mac(SA)),$$

where PRF is a pseudo-random function, ANonce is a random number generated by the authenticator 304, SNonce is a random number generated by the supplicant 302, and the MAC addresses of the supplicant 302 and the authenticator 304 are Mac (AA) and Mac (SA) respectively.

At step 314, using EAPOL-Key frames, the supplicant 302 sends to the authenticator 304 the message M2, which includes the SNonce and the message integrity code/check (MIC). That is, upon generating the PTK, the supplicant 302 sends out SNonce, which is needed by the authenticator 304 t to also generate PTK. The supplicant 302 sends M2 in an EAPOL-key frame to the authenticator 304 with the MIC to ensure the authenticator 304 can verify whether this message was corrupted or modified. Once the SNonce is received, the authenticator 304 can generate the PTK for unicast traffic encryption.

At step 316, the authenticator 304 derives the PTK and uses the PTK to generate the GTK and the pGTK, which is discussed below. The GTK and pGTK can be generated using a simpler process than the PTK because they can be delivered and protected by the EAPOL-Key frames. The authentication servers 222 maintains a randomly generated group master key (GMK), which can be used as input to the PRF along with a random number to generate the GTK.

At step 318, using EAPOL-Key frames, the authenticator 304 sends to the supplicant 302 the message M3, which includes the SNonce and the message integrity code/check (MIC). Once the authenticator 304 has generated the GTK, the authenticator 304 encrypts the GTK and sends it to the supplicant 302 on the network protected by EAPOL-Key frames. If one of the STAs 204 leaves the network, the APs 202 can generate a new GTK from the GMK and a new random number.

At step 320, using EAPOL-Key frames, the supplicant 302 sends to the authenticator 304 the message M2, which confirms that the keys have been installed.

At step 322, the supplicant 302 installs the PTK, GTK, and the pGTK.

At step 324, the authenticator 304 installs the GTK, and the pGTK.

At step 326, upon successful completion of the 4-way handshake 300, the authenticator 304 and supplicant 302 have authenticated each other; and the IEEE 802.1X controlled ports are unblocked to permit general data traffic.

A 4-Way Handshake utilizing EAPOL-Key frames is initiated by the Authenticator to do the following:—Confirm that a live peer holds the PMK.—Confirm that the PMK is current.—Derive a fresh pairwise transient key (PTK) from the PMK. Install the pairwise encryption and integrity keys into IEEE 802.11.—Transport the group temporal key (GTK) and GTK sequence number from Authenticator to Supplicant and install the GTK and GTK sequence number in the STA and, if not already installed, in the AP.—Confirm the cipher suite selection.

Figure 4A:
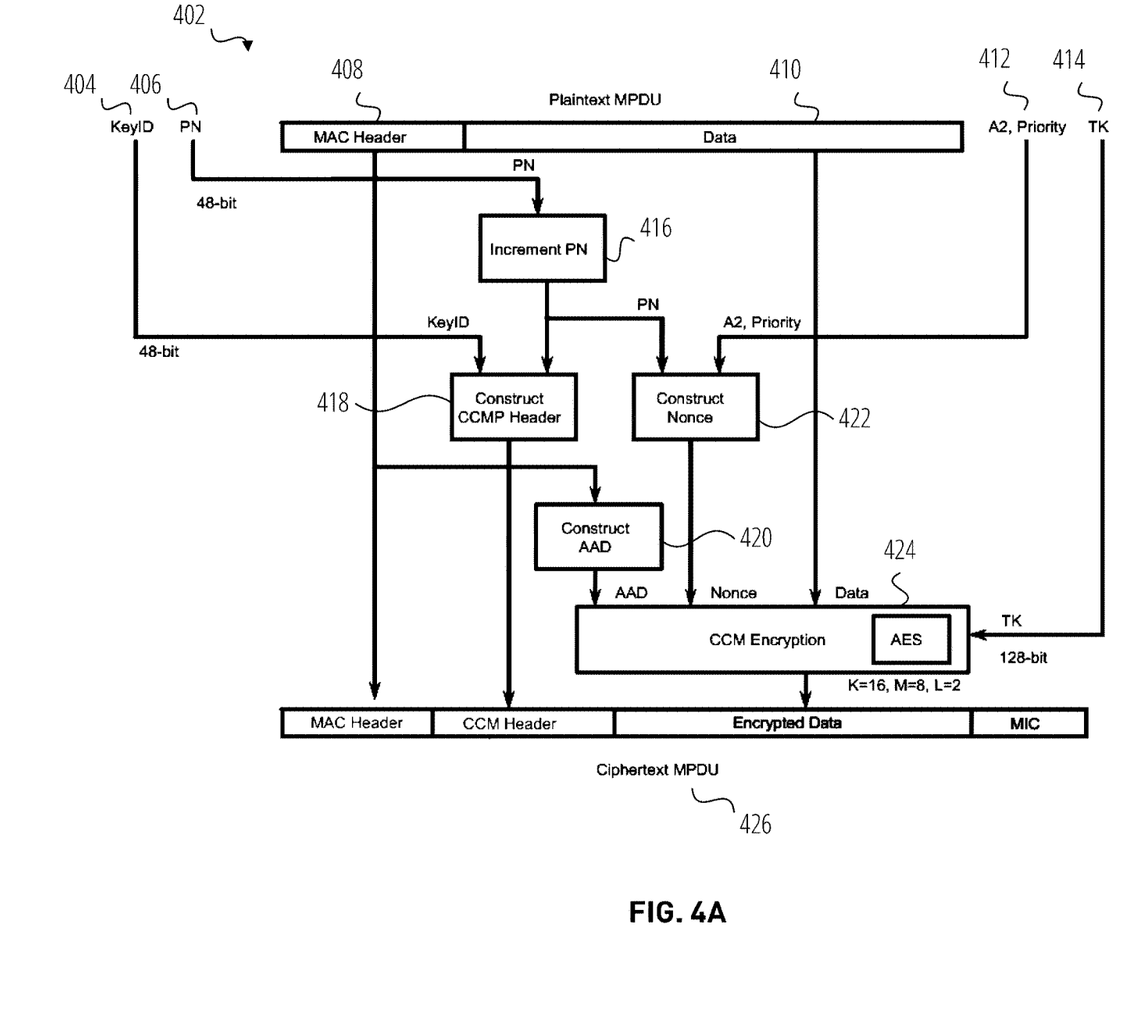
FIG. 4A illustrates a block diagram of an example of encrypting plaintext to cyphertext, in accordance with certain embodiments.

FIG. 4A illustrates a non-limiting example of using a temporal key (TK), such as the pGTK, GTK, or the PTK, to encrypt and transmit a message using a Counter Mode Cipher Block Chaining Message Authentication Code Protocol (CCMP). CCMP is based on CCM, a generic authenticated encryption block cipher mode of AES. 43 CCM is a mode of operation defined for any block cipher with a 128-bit block size. CCM combines two proven cryptographic techniques to achieve robust security. This example using CCMP is non-limiting and other encryption protocols can be used with the TK 414.

The encryption 402 is performed using CCMP encapsulation. CCMP encapsulation is the process of generating the cryptographic payload 426 (ciphertext) from the plaintext data. The plaintext data comprises user traffic 410 and a MAC header 408. The primary steps of CCMP encapsulation are the following:

- The packet number (PN) 406 maintained for the session is incremented at block 416.
- The PN 406 and other portions of the address field 412 are combined to form the nonce at block 422.
- The identifier for the TK 414, or keyID 404, and the PN 406 are combined to form the CCMP header, at block 418.
- The MAC header 408 is used to construct the Additional Authentication Data (AAD), at block 420. According to certain non-limiting examples, the AAD is a 22-byte or 28-byte parameter comprising several fields, including several addresses and the quality-of-service control field, that are used as additional input into the CCM authentication process.
- At block 424, the AAD, nonce, and plaintext data are provided as inputs to CCM along with the TK 414 to encrypt the data 410. The packet header, the CCM header, and the ciphertext data are concatenated to form the ciphertext (or encapsulated) packet 426.

CCM is an "authenticate-and-encrypt" block cipher mode of AES. As such, it both encrypts and produces a MIC.

Figure 4B:
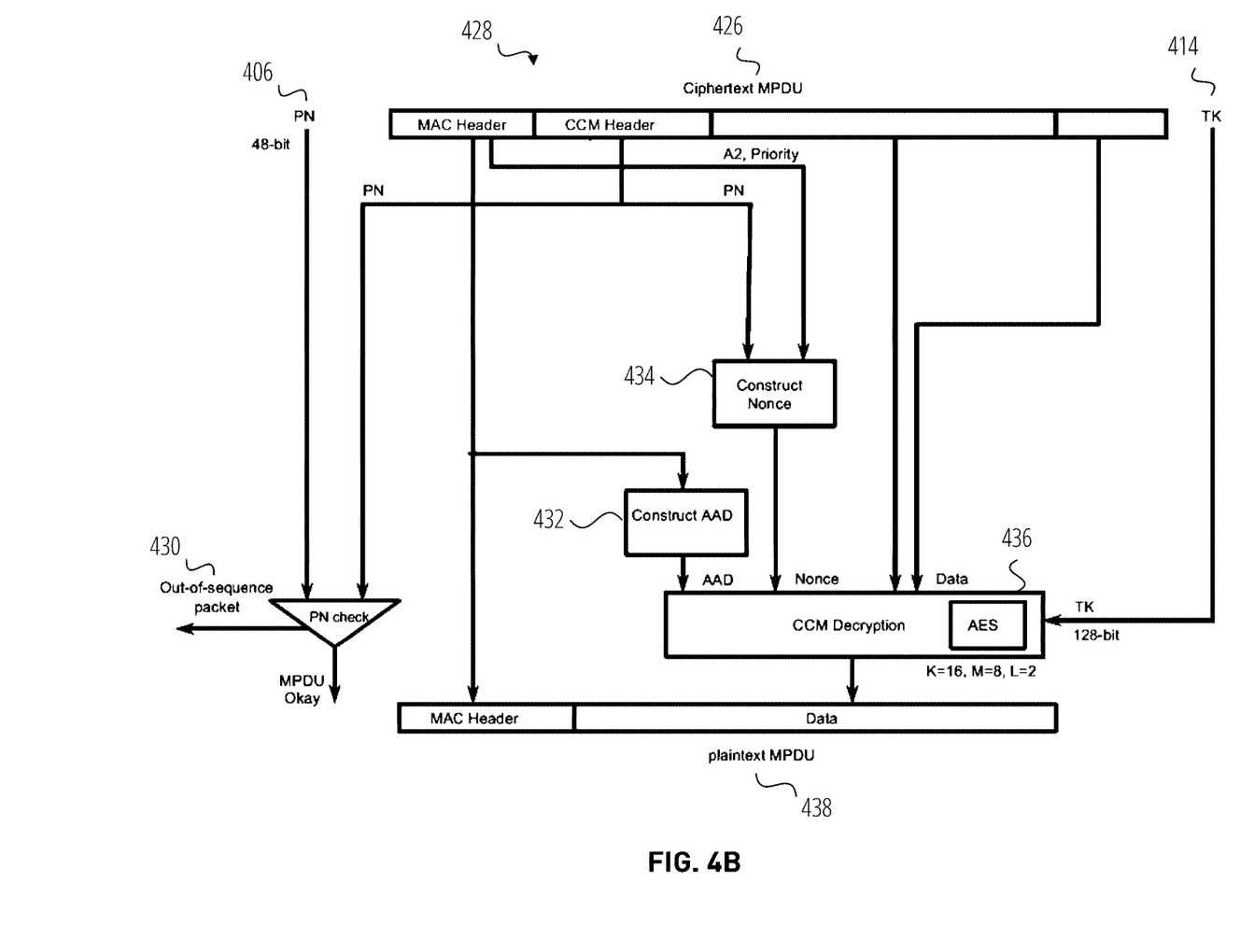
FIG. 4B illustrates a block diagram of an example of decrypting cyphertext to plaintext, in accordance with certain embodiments.

FIG. 4B illustrates a non-limiting example of using the TK (e.g., the pGTK, GTK, or the PTK) to decrypt a message using CCMP. This example using CCMP is non-limiting and other encryption protocols can be used with the TK 414.

The decryption 428 is performed using CCMP decapsulation. CCMP decapsulation is used to recover and decrypt a transmitted frame.

The key steps of CCMP decapsulation are as follows:
- The encrypted frame 426 is parsed to re-construct the AAD and the nonce.
- At block 432, the AAD is formed from the frame header.
- At block 434, the nonce is formed from the PN 406 plus the address fields 412 (e.g., A2 (transmit address) and priority fields).
- At block 436, the CCM uses the Temporal key, AAD, nonce, MIC, and encrypted payload to recover the plaintext data and to verify the MIC. If the MIC integrity check fails, CCM will not return the plaintext. The received frame header and the plaintext data are concatenated to form the plaintext frame.
- The PN in the frame is validated against the PN 406 maintained for the session to generate the outs of sequence indicator 430 and the MPDU okay signal. If the PN received is not greater than the session PN, then the frame is simply discarded. This check prevents replay attacks.

Although FIG. 4B illustrates decryption 428 using the CCMP, this example is non-limiting and other protocols can be used to decrypt cyphertext using the pGTK. For example, Temporal Key Integrity Protocol (TKIP) can be used to decrypt cyphertext using the pGTK. TKIP can be used as a solution for IEEE 802.11 WLANs to address the numerous inadequacies of WEP. TKIP may be implemented through software updates; it does not require hardware replacement of APs and STAs. Encapsulation and decapsulation using TKIP is the process of encrypting and decrypting the cryptographic payload (ciphertext) from the plaintext data. The plaintext data comprises user traffic and the source and destination MAC addresses. TKIP encapsulation builds upon the WEP encapsulation technique, modifying WEP with additional features through software, to bolster security without requiring hardware changes. TKIP uses three distinct keys: two integrity keys and an encryption key. During decapsulation, various checks are performed on the frames. For example, if the TSC indicates a violation of proper frame sequencing (it should be monotonically increasing), the frame is discarded. Also, the MIC is recomputed and compared with the MIC in the packet; if they do not match, the frame is discarded and TKIP countermeasures are invoked, which serve as a TKIP safety net.

When the PTK has been established previously, the keys can be rotated using a 2-way handshake, which omits the first two messages M1 and M2, because the existence of the PTK enables secure transmission of the new keys. For example, using the existing PTK, 2-way Group Key handshake that includes only M3 and M4 can be performed to transmit a new GTK and a new pGTK from the authenticator 304 to the supplicant 302, thereby allowing rotation of the GTK and pGTK using an M3 message as part of a 2-way Group Key handshake.

Figure 5:
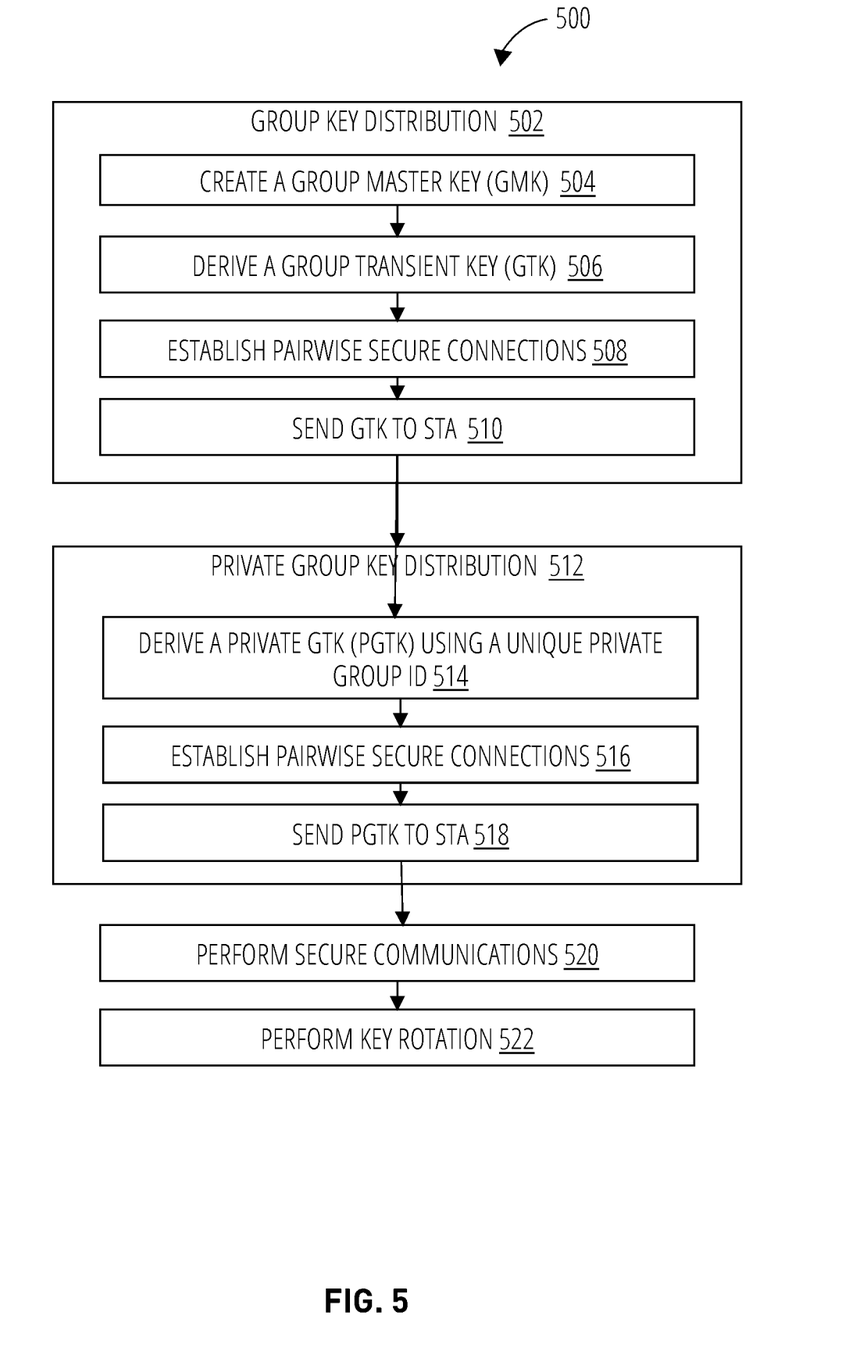
FIG. 5 illustrates a flow diagram of an example of a method for generating a group encryption keys for a global group and a private group, in accordance with certain embodiments.

FIG. 5 illustrates an example method 500 for generating a group encryption keys for a global group and a private group on a wireless station. Although the example method 500 depicts a particular sequence of operations, the sequence may be altered without departing from the scope of the present disclosure. For example, some of the operations depicted may be performed in parallel or in a different sequence that does not materially affect the function of the method 500. In other examples, different components of an example device or system that implements the method 500 may perform functions at substantially the same time or in a specific sequence.

A global group-key for the service set identifier (SSID) is used to encrypt and send multicast/broadcast data between access points (APs) and a group of STA. Since all the STAs belonging to that broadcast domain have a same global group key, even though the traffic is not intended for an STA, the STA will be able to receive and decrypt the traffic and potentially can use it in a malicious way. This can lead to security concerns in use-cases where there is a desire to limit the multicast/broadcast traffic to a limited set of STAs belonging to a private group.

One approach to resolve this concern is for the access point to send unicast message to each of the members in the private group using pairwise keys. Although this will work, this can lead to wastage of over-the-air bandwidth as the same data packet is being transmitted multiple times over the air and will also increase the CPU utilization on the access points.

In addition to the global group key, the methods and systems disclosed herein overcome the above-noted challenges by generating an additional group key used only for the private group based on a unique identifier that identifies all the STAs belonging to the private group. The group identifier is assigned by the network infrastructure elements as part of the STA's on-boarding to the network. This group identifier can be communicated to the wireless infrastructure through an authentication server as part of the STA's authentication. This group identifier can be communicated from the station in a separate information element (IE) as part of the 4-way handshake. Further, if the STA needs to change groups, a new group identifier can be communicated ad-hoc to the STA via an 802.11 IE.

According to some examples, in process 502 of method 500, group key distribution is performed. The generation of a group key is part of the 802.11 standard.

According to some examples, step 504 of process 502 includes creating a group master key (GMK). For example, a 256-bit group master key (GMK) can be created.

According to some examples, step 506 of process 502 includes deriving a group transient key (GTK). For example, a 256-bit group transient key (GTK) can be derived from which group temporal keys are then obtained.

According to certain non-limiting examples, the GTK can be generated by

GTK=HKDF-Expand(GMK, "Global Group", L), where "GMK" is the group master key and "L" is the length of the required key. HKDF-Extract( ) and HKDF-Expand( ) are the functions defined in RFC 5869 instantiated with a hash algorithm based on prime length. HKDF-Extract( ) takes input key material (IKM) such as a shared secret generated using Diffie-Hellman, and an optional salt, and generates a cryptographic key called (e.g., pseudorandom key (PRK)). This acts as a randomness extractor, taking a potentially non-uniform value of high min-entropy and generating a value indistinguishable from a uniform random value. HKDF-Expand( ) takes the PRK, some additional information, and a length, and generates output of the desired length. HKDF-Expand acts as a pseudorandom function keyed on PRK. This means that multiple outputs can be generated from a single IKM value by using different values for the additional information field. The GMK is generated using the HKDF extract/expand function (RFC 5869) by the following steps:
1. HKDF-Extract (salt, IKM)→PRK
2. HKDF-Expand (PRK, info, L)→OKM
3. GMK=HMAC-Hash (salt, IKM)
    where "IKM" is a random number generated by authenticator, "PRK" is a pseudo random key, "okm" is a output key, "info" is a context and application specific information, and "L" is a length of required key.

According to some examples, step 508 of process 502 includes establishing pairwise secure connections.

According to some examples, step 510 of process 502 includes sending GTK to STA. For example, after each pairwise secure connection is established, the GTK can be sent from the AP to the STA.

According to some examples, in process 512 of method 500, private group key distribution is performed.

According to some examples, step 514 of process 512 includes deriving a private GTK (pGTK) using a unique private group ID. According to certain non-limiting examples, the GTK can be generated by pGTK=HKDF-Expand (GMK, "Private Group"||privategroupID, L), where "GMK" is the group master key, "L" is a length of required Key, and "privategroupID" is a private group ID from authenticator.

According to some examples, step 516 of process 512 includes establishing pairwise secure connections at step 516.

According to some examples, step 518 of process 512 includes sending pGTK to STA at step 518. For example, the GTK and pGTK will be sent to the STAs in M3 message with a new KeyID designated for use as a private group key. This can be sent along with the global multicast/broadcast key in the original M3 and/or as Group Key update as part of the 2-way Group Key handshake.

According to some examples, step 520 includes performing secure communications using the GTK for broadcast and multicast message to the entire group, and performing secure communications using the pGTK for messages within the private group.

For example, the GTK and pGTK will be sent to the STAs in M3 message with a new KeyID designated for use as a private group key. This can be sent along with the global multicast/broadcast key in the original M3 and/or as Group Key update as part of the 2-way Group Key handshake.

According to some examples, step 522 includes performing key rotation. For example, In the IEEE 802.11 standard, there are 4 keyIDs available, and the 2nd and 4th Key ID can be used for key rotation of the global and private group keys.

The use of the private group multicast/broadcast key will not only address the security concerns of group communication but also results in efficient usage of network resources.

Effectively, the STA will be part of a global broadcast/multicast group as well as a unique private broadcast/multicast group.

Figure 6:
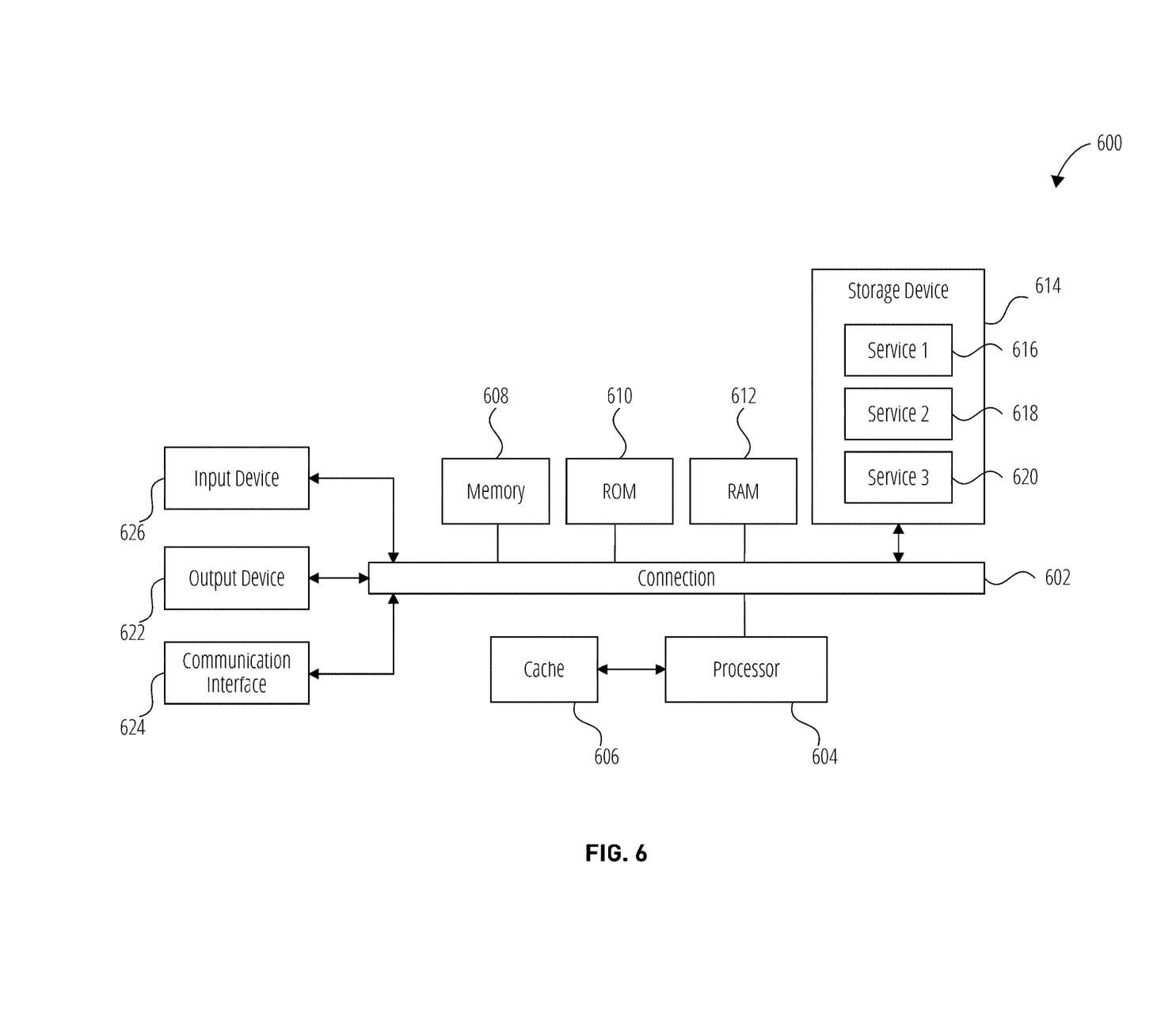
FIG. 6 shows a block diagram of an example of a computing device, in accordance with certain embodiments.

FIG. 6 shows an example of computing system 600, which can be for example any computing device making up a stations (e.g., STA 104 STA 204, STA 208, or STA 210) or any of the APs (e.g., AP 102 or AP 202), or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (CPU or processor) 604 and connection 602 that couples various system components including system memory 608, such as read-only memory (ROM) 610 and random access memory (RAM) 612 to processor 604. Computing system 600 can include a cache of high-speed memory 606 connected directly with, in close proximity to, or integrated as part of processor 604.

Processor 604 can include any general purpose processor and a hardware service or software service, such as services 616, 618, and 620 stored in storage device 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the necessary hardware components, such as processor 604, connection 602, output device 622, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method for generating group encryption keys for a global group and a private group in a wireless network, the method comprising:
   generating a global group key;
   generating a private group key based on a unique private group identifier and a group master key; and
   sending the global group key and the private group key to one or more stations, wherein the global group key encrypts broadcast or multicast messages that can be decrypted by an entire group and the private group key encrypts broadcast or multicast messages that can be decrypted by a private group that is a subset of the entire group.

2. The method of claim 1, further comprising rotating the global group key and the private group key on the one or more stations, wherein each of the one or more stations has four or more key slots for storing keys, two of the slots being used for storing current keyIDs for the global group key and the private group key, and remaining key slots being used for rotating the global group key and the private group key.

3. The method of claim 2, wherein each of the one or more stations has a total of four key slots for storing keys, a first slot and a third slot respectively storing the current keyIDs for the global group key and the private group key, and a second slot and a fourth slot respectively storing new keyIDs for the global group key and the private group key.

4. The method of claim 1, wherein sending the global group key and the private group key in an M3 message.

5. The method of claim 4, wherein the M3 message comprises an EAPOL-Key frame that is based on a pairwise transient key (PTK) generated as part of a 4-way handshake.

6. The method of claim 4, wherein the M3 message is part of a 2-way Group Key handshake.

7. The method of claim 1, wherein the private group key is generated using an HKDF-Expand function.

8. The method of claim 1, further comprising:
encrypting plaintext into cyphertext using the private group key; and
sending the cyphertext to the private group.

9. The method of claim 8, further comprising:
encrypting a broadcast or multicast message into another cyphertext using the global group key; and
sending the another cyphertext to the entire group.

10. A computing apparatus comprising:
a processor; and
a memory storing instructions that, when executed by the processor, configure the apparatus to:
generate a global group key;
generate a private group key based on a unique private group identifier and a group master key; and
send the global group key and the private group key to one or more stations, wherein the global group key encrypts broadcast or multicast messages that can be decrypted by an entire group and the private group key encrypts broadcast or multicast messages that can be decrypted by a private group that is a subset of the entire group.

11. The computing apparatus of claim 10, wherein the stored instructions, when executed by the processor, further configure the apparatus to:
rotate the global group key and the private group key on the one or more stations, wherein each of the one or more stations has four or more key slots for storing keys, two of the slots being used for storing current keyIDs for the global group key and the private group key, and remaining key slots being used for rotating the global group key and the private group key.

12. The computing apparatus of claim 11, wherein each of the one or more stations has a total of four key slots for storing keys, a first slot and a third slot respectively storing the current keyIDs for the global group key and the private group key, and a second slot and a fourth slot respectively storing new keyIDs for the global group key and the private group key.

13. The computing apparatus of claim 10, wherein sending the global group key and the private group key in an M3 message.

14. The computing apparatus of claim 13, wherein the M3 message comprises an EAPOL-Key frame that is based on a pairwise transient key (PTK) generated as part of a 4-way handshake.

15. The computing apparatus of claim 13, wherein the M3 message is part of a 2-way Group Key handshake.

16. The computing apparatus of claim 10, wherein the private group key is generated using an HKDF-Expand function.

17. The computing apparatus of claim 10, wherein the stored instructions, when executed by the processor, further configure the apparatus to:
encrypt plaintext into cyphertext using the private group key;
send the cyphertext to the private group;
encrypt a broadcast or multicast message into another cyphertext using the global group key; and
send the another cyphertext to the entire group.

18. A non-transitory computer-readable storage medium, the computer-readable storage medium including instructions that when executed by a computer, cause the computer to:
generate a global group key;
generate a private group key based on a unique private group identifier and a group master key; and
send the global group key and the private group key to one or more stations, wherein the global group key encrypts broadcast or multicast messages that can be decrypted by an entire group and the private group key encrypts broadcast or multicast messages that can be decrypted by a private group that is a subset of the entire group.

19. The non-transitory computer-readable storage medium of claim 18, further comprising instructions that when executed by a computer, cause the computer to:
rotate the global group key and the private group key on the one or more stations, wherein each of the one or more stations has four or more key slots for storing keys, two of the slots being used for storing current keyIDs for the global group key and the private group key, and remaining key slots being used for rotating the global group key and the private group key.

20. The non-transitory computer-readable storage medium of claim 19, wherein each of the one or more stations has a total of four key slots for storing keys, a first slot and a third slot respectively storing the current keyIDs for the global group key and the private group key, and a second slot and a fourth slot respectively storing new keyIDs for the global group key and the private group key.

* * * * *